US008320387B2

(12) United States Patent
Jiang et al.

(10) Patent No.: US 8,320,387 B2
(45) Date of Patent: Nov. 27, 2012

(54) RING TYPE ETHERNET SYSTEM, RING TYPE SWITCH, RING CONNECTION CONTROL CIRCUIT, RING TYPE ETHERNET SYSTEM CONTROL METHOD, RING TYPE SWITCH CONTROL METHOD AND RING CONNECTION CONTROL METHOD

(75) Inventors: Wei Jiang, Tokyo (JP); Atsushi Seita, Tokyo (JP); Hideki Tashiro, Tokyo (JP)

(73) Assignee: Azbil Corporation (JP)

( * ) Notice: Subject to any disclaimer, the term of this patent is extended or adjusted under 35 U.S.C. 154(b) by 370 days.

(21) Appl. No.: 12/693,229

(22) Filed: Jan. 25, 2010

(65) Prior Publication Data
US 2010/0195660 A1 Aug. 5, 2010

(30) Foreign Application Priority Data
Feb. 5, 2009 (JP) ................................. 2009-024734

(51) Int. Cl.
*H04L 12/28* (2006.01)
(52) U.S. Cl. ......... 370/400; 370/222; 370/245; 370/405
(58) Field of Classification Search .......... 370/222–229, 370/245, 400–405
See application file for complete search history.

(56) References Cited

U.S. PATENT DOCUMENTS

| 6,108,300 | A  | * | 8/2000  | Coile et al. .......................... 370/217 |
| 6,694,271 | B1 | * | 2/2004  | Hannon ............................ 702/58 |
| 6,735,391 | B2 | * | 5/2004  | Lee et al. ............................ 398/3 |
| 6,996,458 | B2 | * | 2/2006  | Pincu et al. ..................... 700/297 |
| 7,113,699 | B1 | * | 9/2006  | Bhate et al. ....................... 398/15 |
| 7,120,360 | B2 | * | 10/2006 | Tian et al. ......................... 398/83 |
| 7,440,397 | B2 | * | 10/2008 | Tsurumi et al. ............... 370/222 |
| 7,599,315 | B2 | * | 10/2009 | Cornet et al. ................ 370/258 |
| 2003/0058790 | A1 | * | 3/2003 | Nagamine ..................... 370/222 |
| 2005/0207348 | A1 | * | 9/2005 | Tsurumi et al. ............... 370/241 |
| 2007/0008964 | A1 | * | 1/2007 | Rose et al. ..................... 370/389 |
| 2007/0047472 | A1 | * | 3/2007 | Florit et al. .................... 370/256 |
| 2008/0050117 | A1 | * | 2/2008 | Koley ............................. 398/49 |
| 2008/0095047 | A1 | * | 4/2008 | Skalecki et al. ............. 370/225 |
| 2009/0141621 | A1 | * | 6/2009 | Fan et al. ....................... 370/223 |
| 2009/0222606 | A1 | * | 9/2009 | Janssen et al. ................ 710/110 |
| 2010/0238813 | A1 | * | 9/2010 | Allan et al. .................... 370/252 |

FOREIGN PATENT DOCUMENTS

| JP | 2006-174422 A | 6/2006 |
| JP | 2008-67244 A | 3/2008 |
| KR | 10-2004-0050949 A | 6/2004 |

* cited by examiner

*Primary Examiner* — Ayaz Sheikh
*Assistant Examiner* — Andrew C Lee
(74) *Attorney, Agent, or Firm* — Troutman Sanders LLP (57) ABSTRACT

Ring type switches 10X, 10Y that connect to two sub-rings 51, 52 are provided to maintain Ethernet communications between sub-rings even when a fault occurs in a ring type switch. By carrying out redundant control processing based on the operating status of itself and the companion in these ring type switches 10X, 10Y, one operates as the currently used system and carries out relay connections between the sub-rings 51, 52 and the other operates as a standby system and stops relay connections between the sub-rings 51, 52.

14 Claims, 8 Drawing Sheets

MAC frame header

RING TYPE ETHERNET SYSTEM, RING TYPE SWITCH, RING CONNECTION CONTROL CIRCUIT, RING TYPE ETHERNET SYSTEM CONTROL METHOD, RING TYPE SWITCH CONTROL METHOD AND RING CONNECTION CONTROL METHOD

CROSS REFERENCE TO RELATED APPLICATIONS

The present application claims priority from Japanese Patent Application No. 2009-024734, filed on Feb. 5, 2009, and is hereby incorporated by reference in its entirety herein.

FIELD OF THE INVENTION

The present invention relates Ethernet (registered trademark) communications technology and specifically to ring type Ethernet communications technology.

BACKGROUND OF THE INVENTION

Surveillance control systems that control the surveillance of building facilities and plant facilities connect various communications equipment that has functions, such as information acquisition functions and control functions, as nodes via communications networks and carry out surveillance control of individual pieces of equipment through a central monitor based on information from these nodes. Ethernets are used as the communications networks in these surveillance control systems.

When a plurality of nodes is connected to an Ethernet, the basis is a star-wired system where each node is connected to a hub or a switch. While this star-wired system is suitable for a comparatively small scale office environment, it is not always suitable for large-scale facilities such as building facilities or plant facilities. A reason for this is that with a star-wired system, it is necessary to connect the hub or switch and each node via its own individual wiring. When a wide range of nodes are installed, the wiring connecting the nodes becomes complicated, and there is an increase in the work burden for wiring construction and maintenance.

Figure 9:
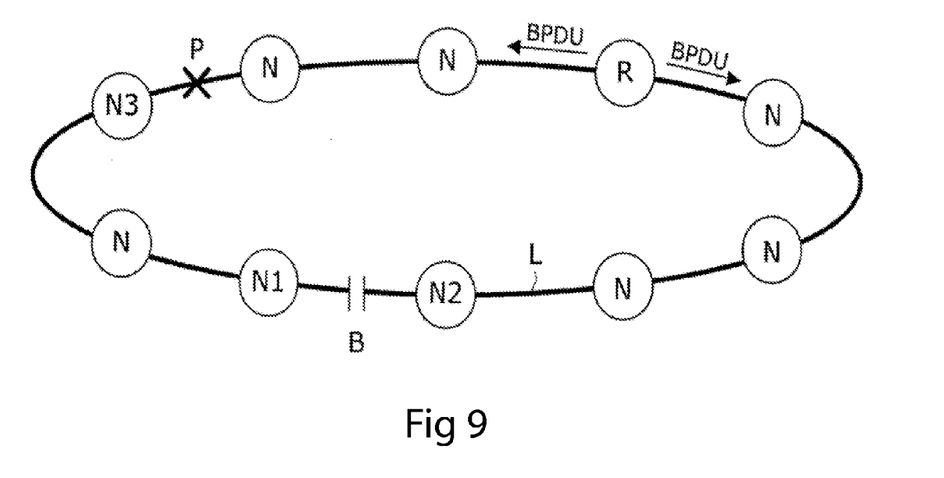
FIG. 9 is an example of the constitution of a typical ring type Ethernet system.

Ring type Ethernets, which make connections with wiring systems across all nodes, have been proposed for this kind of Ethernet. System redundancy may be achieved for these ring type Ethernets using the Spanning Tree Protocol (STP/IEEE 802.1D) function, which avoids communications errors using a ring topography present in the communication path, an improved Rapid STP (RSTP/IEEE 802.1W) function or the like network control function. FIG. 9 is an example of the constitution of a typical ring type Ethernet system. Here, a plurality of nodes N is connected in a ring L via a ring type Ethernet switch. Normally, one root node R is selected out of the nodes connected to the ring by the network control functions for RSTP, STP and the like built into Ethernet switches, and the communications path that is currently used for the tree topology is established based on the ring cost between nodes using an exchange of network control information called Bridge Protocol Data Units (BPDUs) between this root node R and the other nodes.

At this time, the unnecessary communications paths other than the communications path that is currently used are established as backup communications paths for times when there is a failure by blocking the port for the node in question. In the example in FIG. 9, going around to the left and going around to the right may be considered as paths from the root node R to node N1. When the cost going around to the left is less than the cost going around to the right at this time, the path going around to the left is selected as the communications path that is currently used. Therefore, the path away from the node N1 to the node N2 becomes an unnecessary path, and blocking is done at either one of node N1 or node N2, which are at the endpoints of this unnecessary path. Therefore, the original ring L formed from the ring topology is changed to a tree topology formed from two branch paths from the root node R to node N1 and node N2.

Therefore, even if a network is physically formed in a ring topology, the generation of data loops is avoided. In addition, when the BPDUs periodically sent by the root node R to any node cannot be received, it is determined that a failure has arisen in the path between the root node R and the node in question. In such a case, a reconstruction request is sent from the node in question in the opposite direction of the root node R. In response to receiving this reconstruction request, the node that is being blocked cancels the blocking in question. In this manner, the backup communications path that had been blocked is used, and there is reconstruction for a new communications path.

Therefore, when there is a failure at a point P in the example in FIG. 9, a reconstruction request is sent by node N3, and the blocking from node N1 at point B is canceled. There is reconstruction for a new pathway from the root node R to node N3.

When a large-scale Ethernet that is used in a building facility or plant facility is achieved with a single ring using this ring type Ethernet, all nodes share a single ring, so the reliability as a system is reduced.

As technology for solving this problem, a method where the various nodes are divided into a plurality of sub-rings and connected, a typical switching hub used and these sub-rings connected to each other has been proposed. An example of this is disclosed in Japanese Published Unexamined Patent Application No. 2006-174422, which is hereby incorporated by reference in its entirety. Therefore, since the risk is distributed over the various sub-hubs, there is an improvement in reliability as a system.

Since, the physically independent sub-rings are connected through typical switching hubs in this conventional technology, not only user data but also network control data is reciprocally communicable among the sub-rings. In other words, not only are there Ethernet communications, but also a single domain is formed in the network control.

Therefore, there is a problem in that, according to the conventional technology described above, a failure arising in any sub-ring is propagated to the other sub-rings, and since communications path reconstruction operations are executed by the network control function even in the normal sub-rings, there is a temporary failure in the Ethernet communications between nodes connected to the normal sub-rings.

Figure 10:
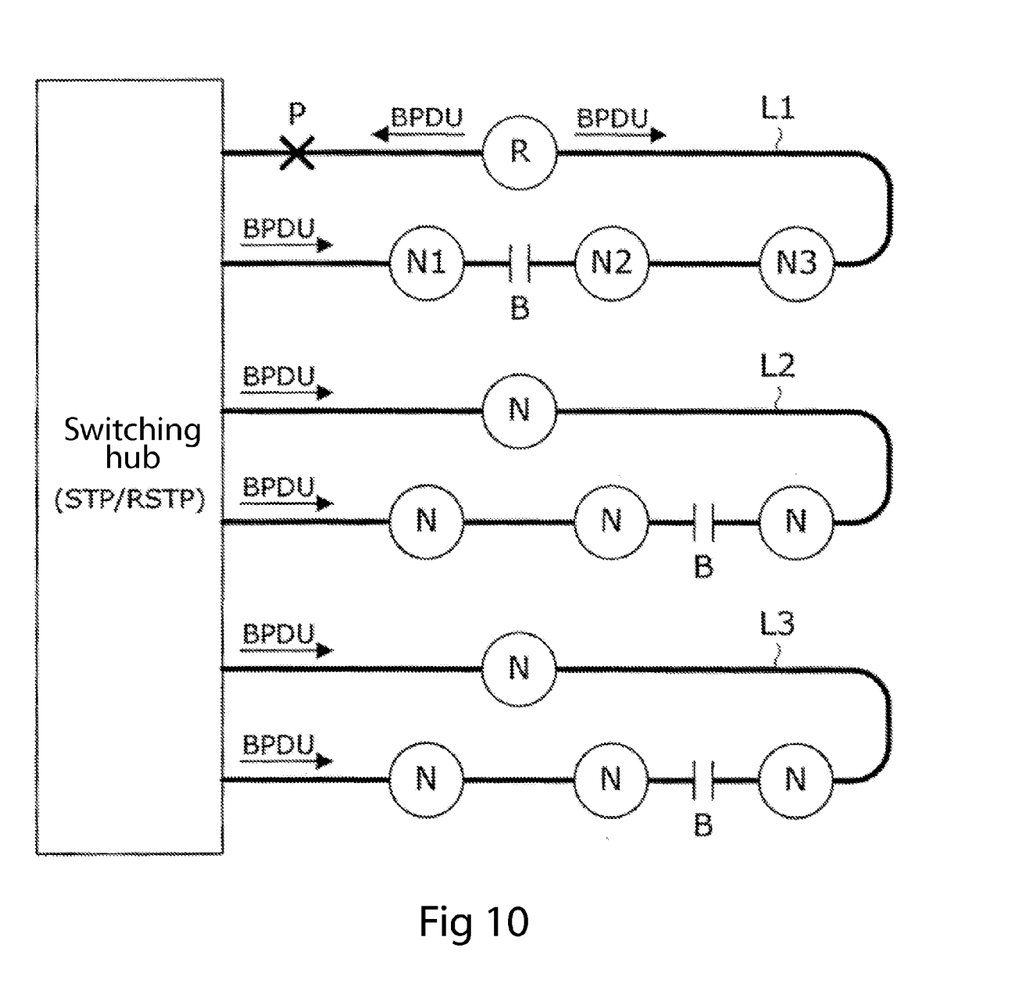
FIG. 10 is an example of the constitution of a ring type Ethernet according to the conventional technology.

FIG. 10 is an example of the constitution of a ring type Ethernet according to the conventional technology. Here, the constitution has three sub-rings L1 through L3, and each of them is connected to the switching hub. This switching hub corresponds to the RSTP, STP or other network control function built into the nodes, and the BPDUs and reconstruction requests used by this network control function have functions that are transferred to the sub-rings L1 through L3.

Therefore, the sub-rings L1 through L3 are seen as a single ring in the network control function, and the BPDUs sent from the root node R of the sub-ring L1 are also transferred to the other sub-rings L2 and L3.

Thus, for example, when a failure occurs at point P on ring L1, a reconstruction request is sent from node N1 to node N2, and the blocking at point B between node N1 and node N2 is canceled. Because of this, the backup communications path joining node N1 and node N2 that had been blocked is used, and there is reconstruction of a new communications path from the root node R to the node N1.

Since there is reconstruction for the new communications path at this time, reconstruction operations are carried out for the various nodes connected to the sub-rings L2 and L3 other than the sub-ring L1 where the failure occurred; therefore, there is a temporary failure in the Ethernet communications among the nodes connected to the normal sub-rings.

SUMMARY OF THE INVENTION

When a MAC frame that includes control information for redundant control processing is received in a ring connection control circuit, a method that polices the outputs for this MAC frame to the other sub-rings may be conceived of as related technology that solves the problems in the conventional technology described above.

Figure 11:
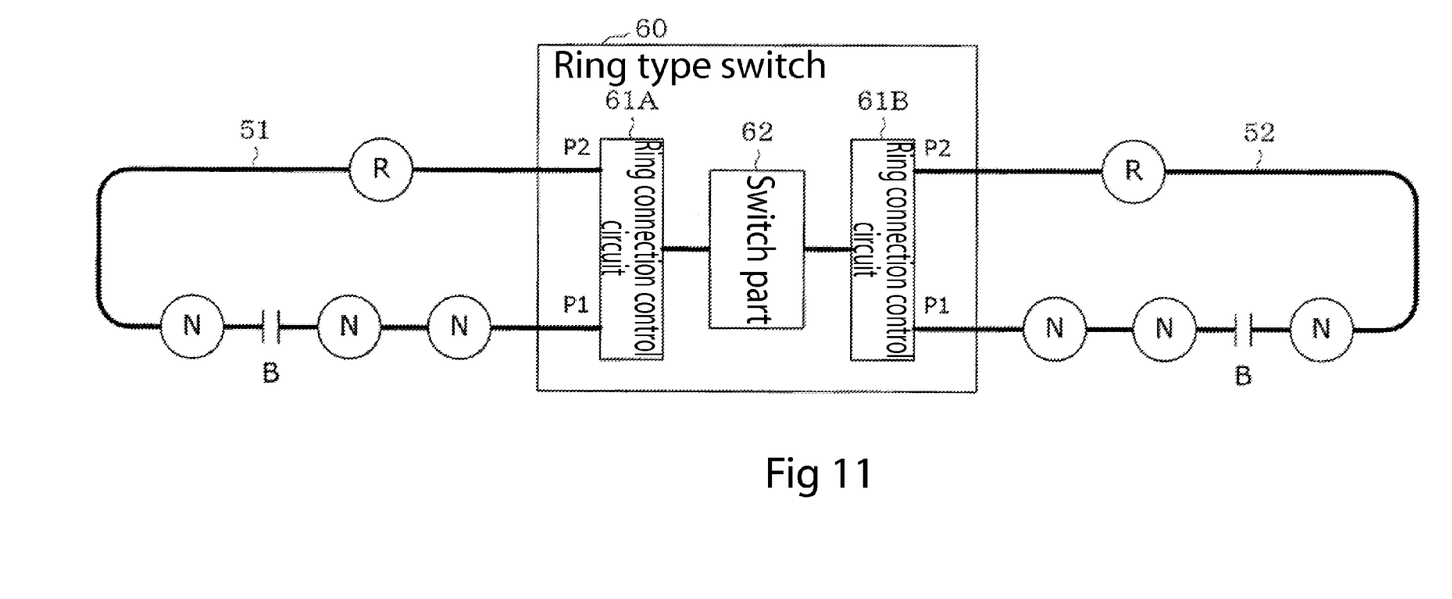
FIG. 11 is an example of the constitution of a ring type Ethernet according to the related technology.

FIG. 11 is an example of the constitution of a ring type Ethernet that has a ring type switch according to the related technology. In this ring type switch 60, ring connection control circuits 61A, 61B provided in correspondence to two sub-rings 51, 52 are connected through a switch part 62.

When a MAC frame that includes control information for redundant control processing for the sub-rings 51, 52 is received from a port on one end of the sub-rings 51, 52 in the ring connection control circuits 61A, 61B, the output of that MAC frame to the switchboard 62 is policed along with that MAC frame being output to the port on the other end of sub-rings 51, 52.

The effects of the redundant control processing in the sub-rings 51, 52 on the other sub-rings connected through the switch part 62 may be controlled by this. Therefore, even if a failure arises in any of the sub-rings, Ethernet communications may be maintained in the normal sub-rings.

However, since the ring type switch carries the bridging between the sub-rings in this related technology, it is an extremely critical circuit constitution for the Ethernet as a whole. Therefore, there has been a problem in that the communications between the sub-rings are interrupted when a failure occurs in this ring type switch. Specifically, when a failure occurs in the ring type switch on the main ring in the case of a large-scale ring type Ethernet, communications with the various nodes on the other sub-rings connected to this main ring become impossible. Therefore, sufficient reliability cannot be obtained in a ring type Ethernet with this related technology.

The present invention solves these problems, and it is an object thereof to provide a ring type Ethernet system, a ring type switch, a ring connection control circuit, a ring type Ethernet system control method, a ring type switch redundant control method and a ring connection control method capable of maintaining Ethernet communications among sub-rings even when a failure arises in a ring type switch.

To achieve this object, the ring type Ethernet system according to the present invention is a ring type Ethernet system that accomplishes Ethernet communications among communications equipment connected to a first sub-ring and communications equipment connected to a second sub-ring by having a relay connection between the first and second sub-rings which connect each of a plurality of different communications equipment in a ring form. It comprises a first ring type switch that along with being connected in series to a first sub-ring is connected in series to a second sub-ring, and a second ring type switch that along with being connected in series to the first sub-ring is connected in series to the second sub-ring. By carrying out redundant control processing based on its own and the other's operating status, which are exchanged with each other, one of these first and second ring type switches operates as the system currently used, making a relay connection between the first and second sub-rings, and the other operates as a standby system, stopping relay connections between the first and second sub-rings.

In addition the ring type switch according to the present invention is a ring type switch used as the first (second) ring type switch in the ring type Ethernet system described above. It comprises a first ring connection control circuit that is connected in series to the first sub-ring, a second ring connection control circuit that is connected in series to the second sub-ring and a switch part that makes relay connections with these first and second ring connection control circuits and includes an internal operation surveillance function that confirms normal operation between these by the first (second) ring connection control circuit exchanging internal operation surveillance frames with the second (first) ring connection control circuit through the switch part, a companion power supply checking function that checks the power supply status of the second (first) ring type switch based on a power supply status signal from the second (first) ring type switch, a companion operation monitoring function that mutually checks the operating status by exchanging extended BPDU frames with the second (first) ring type switch through the first (second) sub-ring and a redundant control processing function that determines whether or not to switch operation of its own ring type switch to the currently used operating mode based on normalcy of its own ring type switch checked by the internal operation surveillance function, the power supply status of the second (first) ring type switch checked by the companion power supply checking function and the operating status of the second (first) ring type switch checked by the companion operation monitoring function when its own ring type switch is operating as the standby system.

A MAC address comparison function that compares the companion MAC address acquired by a BPDU frame and its own MAC address and an initialization processing function that determines whether its own ring type switch will start operation in either the currently used system or standby system mode based on the normalcy of its own ring type switch checked by the internal operation surveillance function directly after introduction of the power supply for its own ring type switch or directly after a failure recovery, the power supply status of the second (first) ring type switch confirmed by the companion power supply checking function, the operating status of the second (first) ring type switch checked by the companion operation monitoring function and the results of comparing the MAC addresses compared by the MAC address comparison function may be included at this time.

In addition, the ring connection control circuit according to the present invention is a ring connection control circuit used as a first (second) ring connection control circuit in the ring type switch described above. It comprises a first MAC processing part that is connected to one end of the first (second) sub-ring and sends and receives MAC frames to and from communications equipment, a second MAC processing part that is connected to the second (first) ring type switch and sends and receives MAC frames to and from this second (first) ring type switch, a RSTP processing part that is connected to the first and second MAC processing parts and which, along with carrying out redundant control processing for the first (second) sub-rings based on the rapid spanning tree protocol, includes the internal operation surveillance function, companion power supply checking function and redundant control processing function, a third MAC processing part that is connected to the switch part and sends and receives MAC frames, and a transfer processing part that transfers the MAC frames received by each of the first MAC processing part, second MAC processing part and third MAC processing part to any of the first MAC processing part, second MAC processing part or third MAC processing part based on destination information included in these MAC frames. When the first and second MAC processing parts have received a MAC frame that includes control information for the first (second) sub-ring that is used for redundancy control processing from the first (second) sub-ring, the output to the transfer processing part for this MAC frame is policed and this MAC frame is output to the RSTP processing part.

The ring type Ethernet system control method according to the present invention is a ring type Ethernet system control method that is used in a ring type Ethernet system that accomplishes Ethernet communications among communications equipment connected to a first sub-ring and communications equipment connected to a second sub-ring by having a relay connection between the first and second sub-rings which connect each of a plurality of different communications equipment in a ring form. The ring type Ethernet system comprises a first ring type switch that along with being connected in series to a first sub-ring is connected in series to a second sub-ring, and a second ring type switch that along with being connected in series to a first sub-ring is connected in series to a second sub-ring. A step where these first and second ring type switches exchange their own and the other's operating status with each other and a step where one of these first and second ring type switches operates as the system currently used, making a relay connection between the first and second sub-rings, and the other operates as a standby system, stopping relay connections between the first and second sub-rings by carrying out redundant control processing based on its own and the other's operating status are executed.

In addition, the ring type switch redundant control method according to the present invention is a ring type switch redundant control method used by a ring type switch that forms the first (second) ring type switch in the ring type Ethernet system described above. It comprises a first ring connection control circuit connected in series to the first sub-ring, a second ring connection control circuit connected in series to the second sub-ring and a switch part that makes relay connections with these first and second ring connection control circuits. An internal operation surveillance step that checks normal operation between these by the first (second) ring connection control circuit exchanging internal operation surveillance frames with the second (first) ring connection control circuit through the switch part, a companion power supply checking step that checks the power supply status of the second (first) ring type switch based on a power supply status signal from the second (first) ring type switch, a companion operation monitoring step that mutually checks the operating status by exchanging extended BPDU frames with the second (first) ring type switch through the first (second) sub-ing and a redundant control processing step that determines whether or not to switch operation of its own ring type switch to the currently used operating mode based on the normalcy of its own ring type switch checked in the internal operation surveillance step, the power supply status of the second (first) ring type switch checked in the companion power supply checking step and the operating status of the second (first) ring type switch checked in the companion operation monitoring step when its own ring type switch is operating as the standby system.

A MAC address comparison step that compares the companion MAC address acquired by a BPDU frame and its own MAC address and an initialization processing step that determines whether its own ring type switch will start operation in either the currently used system or standby system mode based on the normalcy of its own ring type switch checked by the internal operation surveillance function directly after introduction of the power supply for its own ring type switch or directly after a failure recovery, the power supply status of the second (first) ring type switch confirmed by the companion power supply checking function, the operating status of the second (first) ring type switch checked by the companion operation monitoring function and the results of comparing the MAC addresses compared by the MAC address comparison function may be executed.

In addition, the ring connection control method according to the present invention is a ring connection control method used in a ring connection control circuit that forms the first (second) ring connection control circuit in the ring type switch described above. It comprises a first MAC processing step where the first MAC processing part sends and receives MAC frames to and from communications equipment through one end of the first (second) sub-ring, a second MAC processing step where the second MAC processing part sends and receives MAC frames to and from the second (first) ring type switch, a STP processing step where the RSTP processing part is connected to the first and second MAC processing parts, and along with carrying out redundant control processing for the first (second) sub-ring based on the rapid spanning tree protocol, the internal operation surveillance function, companion power supply checking function and redundant control processing function are included, a third MAC processing step where the third MAC processing part sends and receives MAC frames to and from the switch part, a transfer processing step where the transfer processing part carries out the mutual exchange of the MAC frames from the first (second) sub-rings received by the first and second MAC processing parts and the MAC frames from the switch part received by the third MAC processing part. When the first and second MAC processing steps have received a MAC frame that includes control information for the first (second) sub-ring that is used for redundancy and control processing, the output to the transfer processing part for this MAC frame is policed, and this MAC frame is output to the RSTP processing part.

Since redundancy has been created for the ring type switch that connects the two sub-rings according to the present invention, Ethernet communications may be maintained by a normal ring type switch even when a failure occurs in one ring type switch.

Therefore, if a ring connection control circuit is provided for each sub-ring, sufficient reliability may be obtained for Ethernet communications between the sub-rings even when the effects of redundant control processing are suppressed in individual sub-rings by the policing of the transfer to the other sub-rings for MAC frames that include control information for redundant control processing for individual sub-rings.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE INVENTION

Next, an embodiment of the present invention will be described with reference to the drawings.

Figure 1:
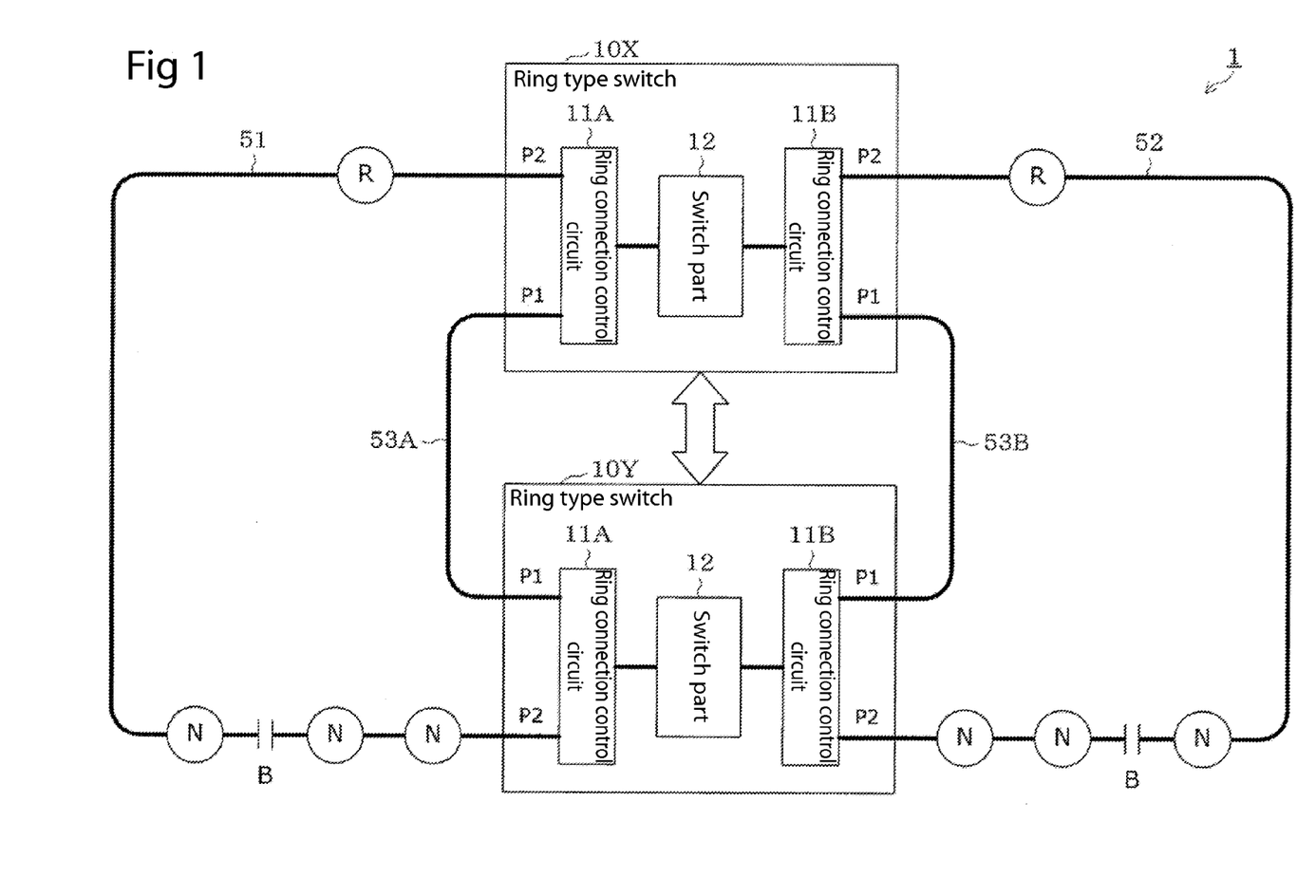
FIG. 1 is a block diagram showing the constitution of a ring type Ethernet system and a redundant ring type switch according to the present embodiment.

First, the ring type switch according to the present embodiment will be described referring to FIG. 1. FIG. 1 is a block diagram showing the constitution of a ring type Ethernet system and a redundant ring type switch according to the present embodiment.

A ring type switch (first ring type switch) 10X, which along with being connected in series to a sub-ring (first sub-ring) 51 is connected in series to a sub-ring (second sub-ring) and a ring type switch (second ring type switch) 10Y and along with being connected in series to the sub-ring (first sub-ring) 51 is connected in series to the sub-ring (second sub-ring) are provided in this ring type Ethernet system 1.

Thus, the ring type Ethernet system 1 has a constitution where the ring type switch that makes relay connections of the two sub-rings 51, 52 has been made redundant by the two, the ring type switch 10X and the ring type switch 10Y.

By carrying out redundant control processing based on the operating status of itself and the companion in these ring type switches 10X, 10Y in this embodiment, one operates as the currently used system and carries out relay connections between the sub-rings 51, 52 and the other operates as a standby system and stops relay connections between the sub-rings 51, 52.

Two, a ring connection control circuit (first ring connection control circuit) 11A and a ring connection control circuit (second ring connection control circuit) 11B, and a switch part 12 that makes relay connections of these are provided in the ring type switch 10 (10X, 10Y). Two ports P1, P2 are provided in each of the ring connection control circuits 11A, 11B.

A plurality of communications equipment (root node R and nodes N) are connected in series in a ring shape in the sub-ring 51 and the endpoints of that ring are connected to the port P2 in the ring connection control circuit 11A of the ring type switch 10X and the port P2 in the ring connection control circuit 11A of the ring type switch 10Y. Similarly, a plurality of communications equipment (root node R and nodes N) are connected in series in a ring shape in the sub-ring 52 and the endpoints of that ring are connected to the port P2 in the ring connection control circuit 11B of the ring type switch 10X and the port P2 in the ring connection control circuit 11B of the ring type switch 10Y.

In addition, the port P1 in the ring connection control circuit 11A of the ring type switch 10X and the port P1 in the ring connection control circuit 11A of the ring type switch 10Y are connected by a relay path 53A, and frames that reach one ring endpoint through the sub-ring 51 are relayed to the other end by the ring type switches 10X, 10Y and the relay path 53A. Similarly, the port P1 in the ring connection control circuit 11B of the ring type switch 10X and the port P1 in the ring connection control circuit 11B of the ring type switch 10Y are connected by a relay path 53B, and frames that reach one ring endpoint through the sub-ring 52 are relayed to the other end by the ring type switches 10X, 10Y and the relay path 53B.

One of the ring type switches 10X, 10Y operates as the currently used system based on its own and the other's operating status, and the other operates as a standby system. When it operates as the currently used system, communications are possible between the ring 51 and the ring 52 through the switch part 12, and when it operates as the standby system communications between the ring 51 and the ring 52 are blocked by the switch part 12.

In the present invention, the operating mode when operating as the currently used system is called the active (ACTIVE) mode, and the operating mode when operating as the backup system is called the backup (BACKUP) mode. In addition, the operating mode during the initialization processing that is executed directly after introduction of a power supply or directly after a failure recovery is called the initial (INITIAL) mode, and the operating mode when a failure occurs is called failure (FAILURE).

The operating mode of the ring type switches 10X, 10Y directly after the introduction of the power supply and directly after a failure recovery is automatically determined by the initialization processing. For example, there is the method of acquiring the companion MAC address from a BPDU from the companion, comparing with its own MAC address, initiating operation in the active mode for the one with the smaller MAC address and initiating operation in the backup mode for the one with the larger MAC address for this operating mode determination method.

In addition, when a failure arises in one of the ring type switches 10X, 10Y operating in the active mode after the initialization processing, the other one operating in the backup mode initiates operation in the active mode by the execution of redundant control processing on the side operating in backup mode. When there is recovery for the failure after operating mode switching, initialization processing is executed in one of the ring type switches, and it restarts operation in the backup mode.

[Ring Connection Control Circuit]

Figure 2:
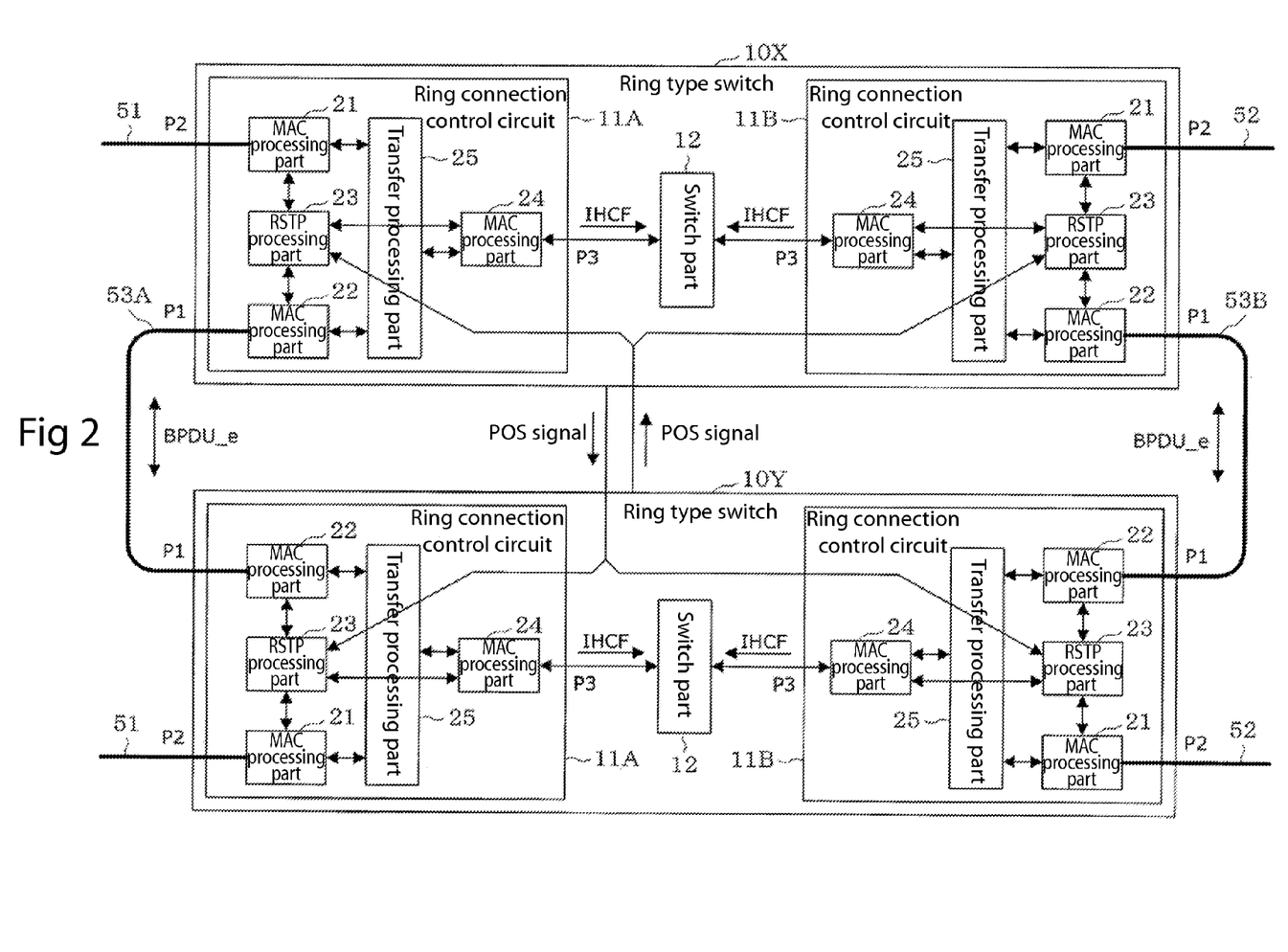
FIG. 2 is a block diagram showing the constitution of a ring connection control circuit.

Next, the constitution of the ring connection control circuit used by the ring type switch according to the present embodiment will be described in detail with reference to FIG. 2. FIG. 2 is a block diagram showing the constitution of a ring connection control circuit. Ring connection control circuits 11 (11A, 11B) are formed from electronic circuits formed on a semiconductor chip and have a connection control function when the sub-rings 50 (51, 52), which connect a plurality of communications equipment (root node R and nodes N) in a ring shape, are connected to the ring type switches 10 (10X, 10Y).

As the main processing parts, a MAC processing part (first MAC processing part) 21, a MAC processing part (second MAC processing part) 22 and a RSTP processing part 23, a MAC processing part (third MAC processing part) 24 and a transfer processing part 25 are provided in the ring connection control circuits 11.

The MAC processing part 21 connects one end of the sub-ring 50 through the port P2 for ring connection and has a sending and receiving function for MAC frames with the communications equipment (root node R and nodes N), a function for policing the output to the transfer processing part 25 for the MAC frame when a MAC frame that includes control information for redundant control processing related to the sub-ring 50 is received from the sub-ring 50 and a function for outputting the MAC frame that contains control information for redundant control processing to the RSTP processing part 23.

The MAC processing part 22 connects the port P1 for ring connection and the port P1 of the companion ring type switch and has a sending and receiving function for MAC frames with companion ring type switch, a function for policing the output to the transfer processing part 25 for the MAC frame when a MAC frame that includes control information for redundant control processing related to the sub-ring 50 is received from the companion ring type switch and a function for outputting the MAC frame that contains control information for redundant control processing to the RSTP processing part 23.

The RSTP processing parts 23 are each connected to the MAC processing parts 21, 22 and have a function for carrying out redundant control processing for the sub-rings 50 based on the rapid spanning tree protocol (RSTP) and a function for carrying out redundant control of the ring type switches.

The redundant control processing has the set-up processing for the currently used communications path that was, for example, described previously with FIG. 9 and the switching processing for the backup system communications path by canceling the blocking in response to the occurrence of failures in the currently used communications path.

Figure 3:
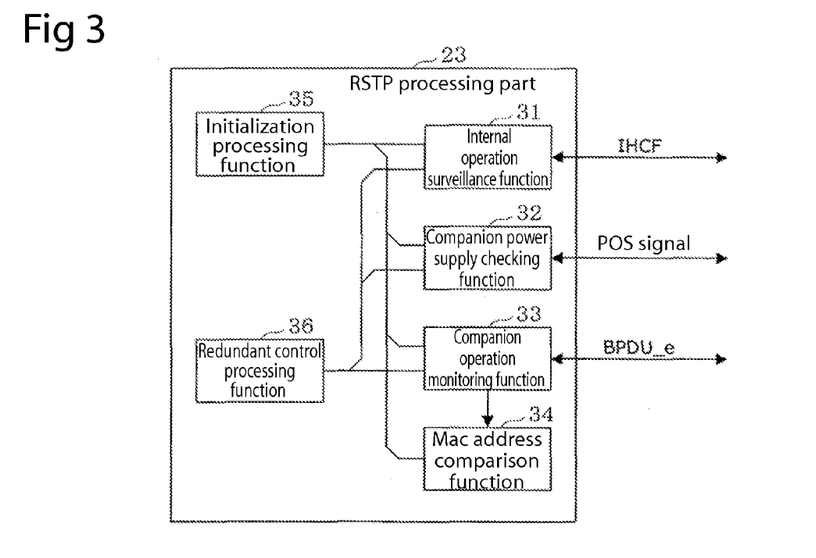
FIG. 3 is an example of the constitution of a ring type switch redundant control part for a RSTP processing part.

FIG. 3 is an example of a constitution for the redundant control part of the ring type switch of the RSTP processing part. An internal operation surveillance function 31, companion power supply checking function 32, companion operation monitoring function 33, MAC address comparison function 34, initialization processing function 35 and redundant control processing function 36 are provided in the RSTP processing part 23 as the main functions for redundant control processing.

The internal operation surveillance function 31 is a function that checks the mutual normalcy of this switch part 12 by exchanging internal operation surveillance frames (IHCF: internal health check frames) between the ring connection control circuits 11A, 11B.

Figure 4:
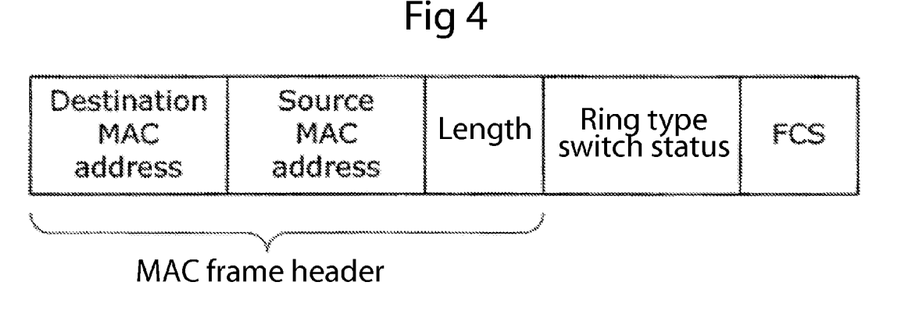
FIG. 4 is an example of the constitution of an internal operation surveillance frame.

FIG. 4 is an example of the constitution of an internal operation surveillance frame. In this example of a constitution for the internal operation surveillance frame, status information showing the operating status of its own ring connection control circuit is added to the typical MAC frame header that includes the destination MAC address, sender MAC address and frame length.

The companion power supply checking function 32 is a function for checking the power supply status of the other ring type switch based on a power supply status signal (POS: Power ON Status) from the other ring type switch.

The operation monitoring function 33 is a function for mutually exchanging operating status between the companion ring type switches using extended BPDU frames (BPDU_e: Bridge Protocol Data Unit external) through the relay paths 53A, 53B.

Figure 5:
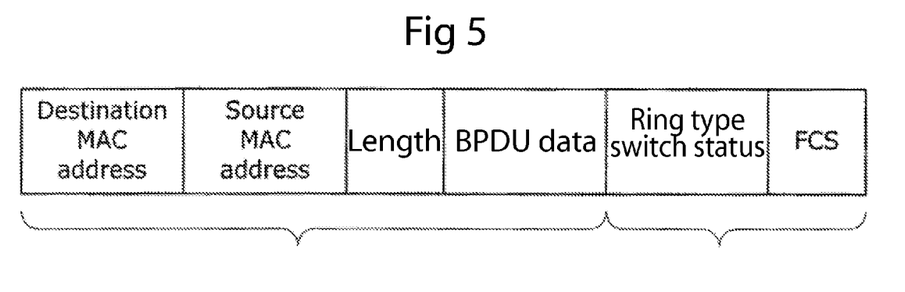
FIG. 5 is an example of the constitution of an extended BPDU frame.

FIG. 5 is an example of the constitution of an extended BPDU frame. Status information about the operating status of its own switch is added to the standard BPDU definition in the example of the constitution of this extended BPDU frame.

The MAC address comparison function 34 is a function for comparing the companion's MAC address with its own MAC address using the extended BPDU frames from the operation monitoring function 33.

The initialization processing function 35 is a function for executing initialization processing directly after power supply introduction or directly after failure recovery and determining its own operating mode based on the operating status of itself and the companion during operation initialization.

The redundant control processing function 36 is a function for executing redundant control processing following the initialization processing and switching its own operating mode based on the operating status of its self and the companion.

The MAC processing part 24 is connected to a port P3 for non-ring connections and has a function for sending and receiving the internal operation surveillance frames exchanged with the companion ring connection control circuit connected via the switch part 12 and the RSTP processing part 23.

The transfer processing part 25 has a function for transferring the MAC frames output by the MAC processing parts 21, 22, 24 to any of these MAC processing parts 21, 22, 24 based on the destination information included in those MAC frames and a function for controlling the policing of the exchange of MAC frames with the MAC processing part 24 based on its own operating mode stored in a memory part (not shown in the drawing) established by the RSTP processing part 23.

When it is operating in the active mode itself at this time, the transfer processing part 25 cancels the policing of the exchange of MAC frames with the MAC processing part 24 and makes communications between the ring 51 and the ring 52 possible through the switch part 12. When it is operating in the backup mode itself, the transfer processing part 25 polices the exchange of MAC frames with the MAC processing part 24 and blocks communications between the ring 51 and the ring 52 through the switch part 12.

[Operation of One Embodiment]

Figure 6:
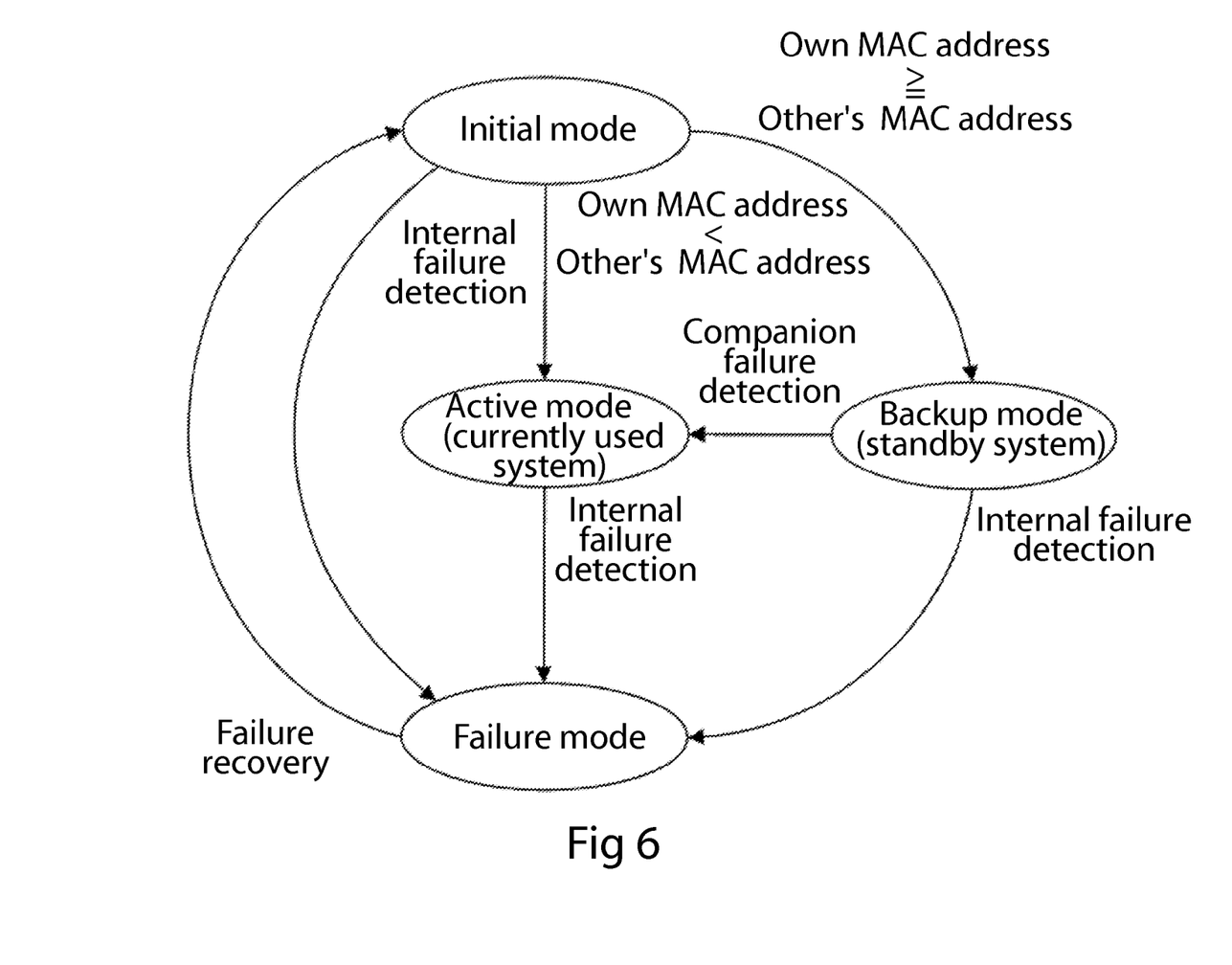
FIG. 6 is a transition diagram showing the operating mode for the ring type switch.
Figure 7:
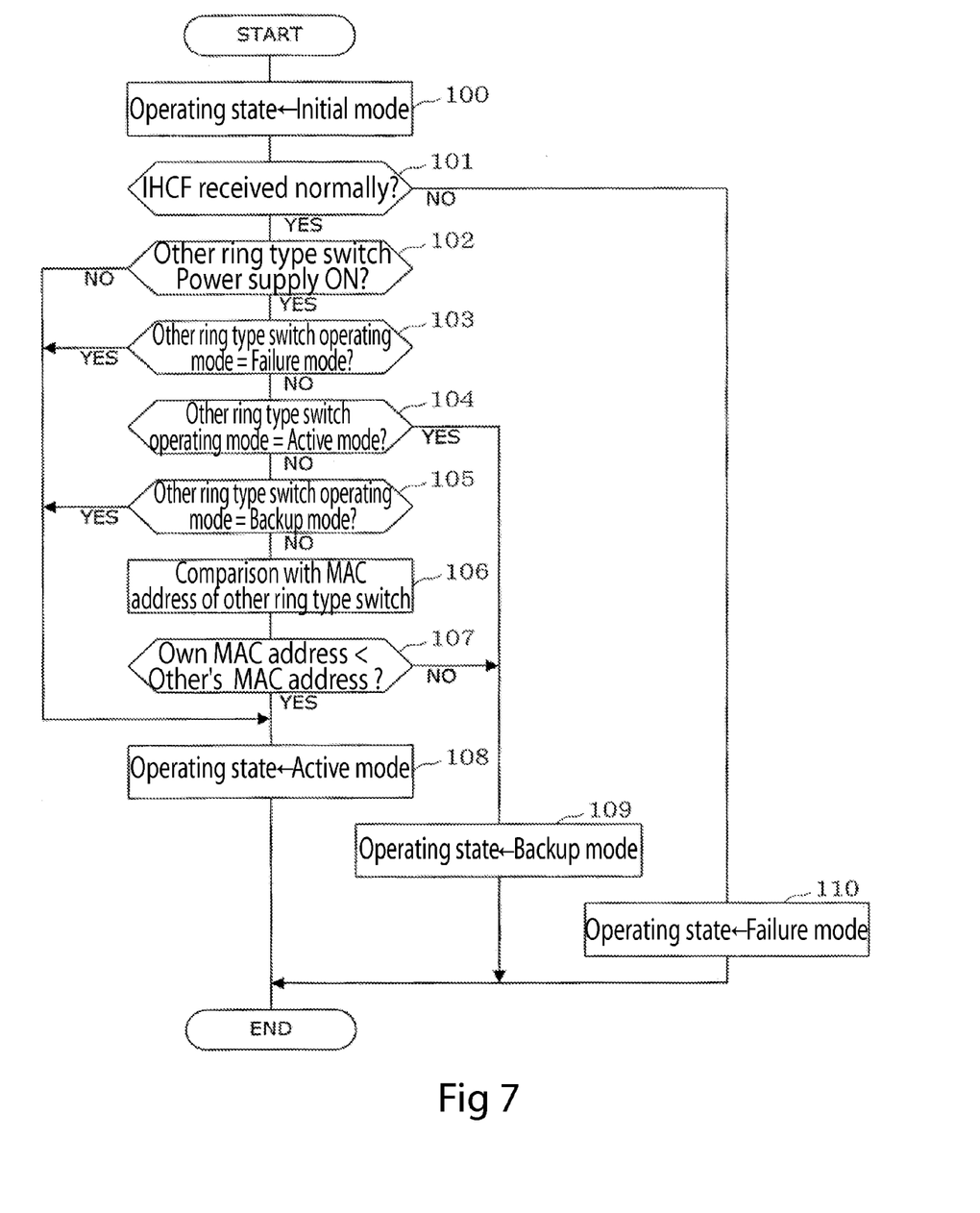
FIG. 7 is a flow chart showing the initial processing for a ring connection control circuit.
Figure 8:
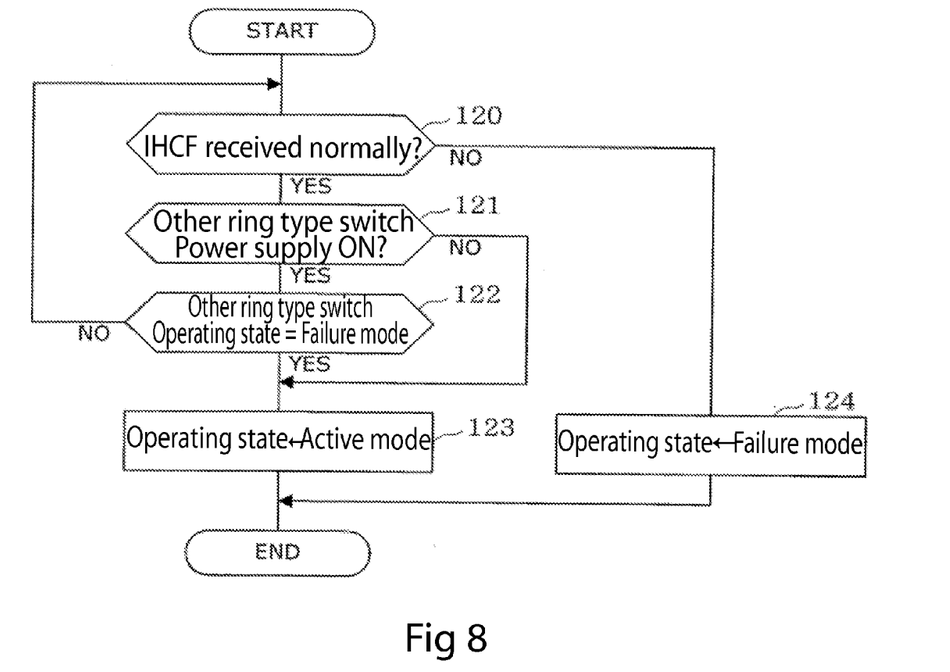
FIG. 8 is a flow chart showing the redundant control processing for a ring connection control circuit.

Next, the operation of the Ring type switch and ring connection control circuit of the present embodiment will be described with reference to FIG. 6 through FIG. 8. FIG. 6 is a transition diagram showing the operating mode for the ring type switch. FIG. 7 is a flow chart showing the initialization processing for the ring connection control circuit. FIG. 8 is a flow chart showing the redundant control processing for a ring connection control circuit.

The ring type switches 10X, 10Y transition the four operating modes according to the transition diagram in FIG. 6. When the ring type switches 10X, 10Y have detected an internal failure in themselves according to the internal operation surveillance function 31 in the initial mode that carries out in initialization processing directly after power supply introduction or directly after a failure recovery, they move to the failure mode. In addition, when the companion MAC address is larger than its own according to an initial operation determining function without detecting an internal failure, it changes to the active mode, and in the opposite case, it changes to the backup mode.

On the other hand, when an internal failure is detected by itself according to the internal operation surveillance function 31 in the active mode and backup mode, it changes to the failure mode. In addition, when a failure is detected in the other ring type switch according to the redundant control processing function 36 in the backup mode, it changes to the active mode.

[Initialization Processing]

Next, the initialization processing for the ring connection control circuit will be described in detail with reference to FIG. 7. Here, the description will use the initialization processing in the ring connection control circuit 11A of the ring type switch 10X as an example.

Directly after power supply introduction or directly after recovery from failure, the ring connection control circuit 11A of the ring type switch 10X executes the initialization processing in FIG. 7 using the initialization processing function 35 of the RSTP processing part 23. The initialization processing in FIG. 7 is also being executed in parallel in the ring connection control circuit 11B of the ring type switch 10X by the initialization processing function 35 of the RSTP processing part 23.

In the initialization processing, the initialization processing function 35 of the RSTP processing part 23 provided in the ring connection control circuit 11A first sets its own operating status, which is held in the memory part (not shown in the drawing), in the initial mode (Step 100).

Next, the initialization processing function 35 confirms normal operation of the companion ring connection control circuit 11B by exchanging internal operation surveillance frames with the RSTP processing part 23 of the companion ring connection control circuit 11B in the ring type switch 10X through the switch part 12 using the internal operation surveillance function 31 (Step 101).

When normal operation of the companion ring connection control circuit 11B cannot be confirmed here (Step 101: NO), the initialization processing function 35 sets its own operating status to the failure mode (Step 110), and completes the sequence of initialization processing.

On the other hand, when normal operation of the companion ring connection control circuit 11B can be confirmed (Step 101: YES), the initialization processing function 35 checks power supply status of the companion ring type switch 10Y based on the power supply status signal from the companion ring type switch 10Y according to the companion power supply checking function 32 (Step 102).

When power OFF is confirmed for the power supply status of the companion ring type switch 10Y here (Step 102: NO), the initialization processing function 35 sets its own operating status to the active mode (Step 108) and completes the initialization processing sequence.

On the other hand, when power ON can be confirmed for the power supply status of the companion ring type switch 10Y (Step 102: YES), the initialization processing function 35 checks (Step 103) the operating status of the companion ring type switch 10Y by exchanging extended BPDU frames with the RSTP processing part 22 of the companion ring type switch 10Y through the MAC processing part 22 and relay path 53A using the companion operation monitoring function 33.

When the operating status of the companion ring type switch 10Y is the failure mode (Step 103: YES), the initialization processing function 35 sets its own operating status to the active mode (Step 108) and completes the initialization processing sequence.

In addition, when the operating status of the companion ring type switch 10Y is the active mode (Step 104: YES) and not the failure mode (Step 103: NO), the initialization processing function 35 sets its own operating status to the backup mode (Step 109) and completes the initialization processing sequence.

On the other hand, when the operating status of the companion ring type switch 10Y is the backup mode (Step 105: YES) and not the active mode (Step 104: NO), the initialization processing function 35 sets its own operating status to the active mode (Step 108) and completes the initialization processing sequence.

In addition, when the operating status of the companion ring type switch 10Y is neither the failure mode nor active mode, in other words, the companion ring type switch 10Y is in the initialization processing status (Step 105: NO), the initialization processing function 35 compares the companion MAC address with its own MAC address by exchanging extended BPDU frames using the companion operation monitoring function 33 and using the MAC address comparison function 34 (Step 106).

When its own MAC address is smaller than the companion's MAC address here (Step 107: YES), the initialization processing function 35 sets its own operating status to the active mode (Step 108) and completes the initialization processing sequence. On the other hand, when its own MAC address is larger than or equal to the companion's MAC address (Step 107: NO), the initialization processing function 35 sets its own operating status to the backup mode (Step 109) and completes the initialization processing sequence.

[Redundant Control Processing]

Next, the redundant control processing for the ring connection control circuit will be described in detail with reference to FIG. 8. Here, the description will use the redundant control processing in the ring connection control circuit 11A of the ring type switch 10X as an example.

When the connection control circuit 11A of the ring type switch 10X itself is operating in the backup mode after the initialization processing, the redundant control processing in FIG. 8 is executed by the redundant control processing function 36 of the RSTP processing part 23.

In the redundant control processing, the redundant control processing function 36 of the RSTP processing part 23 provided in the ring connection control circuit 11A first confirms normal operation of the companion ring connection control circuit 11B using the internal operation surveillance function 31 by exchanging internal operation surveillance frames with the RSTP processing part 23 of the companion ring connection control circuit 11B in the ring type switch 10X through the switch part 12 (Step 120).

When normal operation of the companion ring connection control circuit 11B cannot be confirmed (Step 120: NO), the redundant control processing function 36 sets its own operating status to the failure mode, (Step 124) and completes the redundant control processing sequence.

On the other hand, when normal operation can be confirmed for the companion ring connection control circuit 11B (Step 120: YES), the redundant control processing function 36 checks the power supply status of the companion ring type switch 10Y based on the power supply status signal from the companion ring type switch 10Y using the companion power supply checking function 32 (Step 121).

When power supply OFF is confirmed as the power supply status for the companion ring type switch 10Y here (Step 121: NO), the redundant control processing function 36 sets its own operating status to the active mode (Step 123), and completes the redundant control processing sequence.

On the other hand, when power ON can be confirmed for the power supply status of the companion ring type switch 10Y (Step 121: YES), the redundant control processing function 36 checks (Step 122) the operating status of the companion ring type switch 10Y by exchanging extended BPDU frames with the RSTP processing part 23 of the companion ring type switch 10Y through the MAC processing part 22 and relay path 53A using the companion operation monitoring function 33.

When the operating status for the ring type switch 10Y is not the failure mode here (Step 122: NO), there is a return to Step 120 previously described.

On the other hand, when the operating status of the ring type switch 10Y is the failure mode (Step 122: YES), the redundant control processing function 36 sets its own operating status to the active mode (Step 123), and completes the redundant control processing sequence.

[Effects of the Present Embodiment]

Thus, since redundancy has been created for the ring type switch that connects the two sub-rings according to the present embodiment, Ethernet communications may be maintained by a normal ring type switch even when a failure occurs in one ring type switch.

Therefore, if a ring connection control circuit is provided for each sub-ring, sufficient reliability may be obtained for Ethernet communications between the sub-rings even when the effects of redundant control processing are suppressed in individual sub-rings by the policing of the transfer to the other sub-rings for MAC frames that include control information for redundant control processing for individual sub-rings.

[Explanation of the Elements]

1 ring type Ethernet system, 10 ring type switch, 10X ring type switch (first ring type switch), 10Y ring type switch (second ring type switch), 11 ring connection control circuit, 11A ring connection control circuit (first ring connection control circuit), 11B ring connection control circuit (second ring connection control circuit), 12 switch part, 21 MAC processing part (first MAC processing part), 22 MAC processing part (second MAC processing part), 23 RSTP processing part, 24 MAC processing part (third MAC processing part), 25 transfer processing part, 31 internal operation surveillance function, 32 companion power supply checking function, 33 companion operation monitoring function, 34 MAC address comparison function, 35 initialization processing function, 36 redundant control processing function, 50 some-ring, 51 sub-ring (first sub-ring), 52 sub-ring (second sub-ring).

While the invention has been particularly shown and described with reference to a number of preferred embodiments thereof, it will be understood by those skilled in the art that various changes in form and details may be made therein without departing from the spirit and scope of the invention. Accordingly, the invention is to be limited only by the scope of the claims and their equivalents.

The invention claimed is:

1. A ring type Ethernet system for Ethernet communications among communications equipment connected to a first sub-ring and communications equipment connected to a second sub-ring by having a relay connection between the first and second sub-rings, the relay connection connecting each of a plurality of different communications equipment in a ring form, the ring type Ethernet system comprising:

a first ring type switch that, along with being connected in series to the first sub-ring, is connected in series to the second sub-ring; and a second ring type switch that, along with being connected in series to the first sub-ring, is connected in series to the second sub-ring, wherein:

one of the first and second ring switches includes:

a first ring connection control circuit that is connected in series to the first sub-ring;

a second ring connection control circuit that is connected in series to the second sub-ring; and a switch part that makes relay connections with the first and second ring connection control circuits, an operating status of the first ring type switch and an operating status of the second ring type switch are exchanged between the first and second ring type switches, by carrying out redundant control processing based on the operating status of the second ring type switch and the operating status of the first ring type switch one of the first and second ring type switches operates as a currently used system by making a relay connection between the first and second sub-rings, and another one of the first and second ring type switches operates as a standby system by stopping relay connections between the first and second sub-rings, and one of the first and second ring connection control circuits is configured to perform:

an internal operation surveillance function that confirms a normal operation by one of the first and second ring connection control circuits by exchanging internal operation surveillance frames with the another one of the first and second ring connection control circuits through the switch part, a companion power supply checking function that checks a power supply status of the another one of the first and second ring type switches based on a power supply status signal from the another one of the first and second ring type switches, a companion operation monitoring function that mutually checks the operating status by exchanging extended bridge protocol data unit (BPDU) frames with the another one of the first and second ring type switches through one of the first and second sub-rings, and a redundant control processing function that, when the one of the first and second ring type switches is operating as the standby system, determines whether or not to switch an operation of the one of the first and second ring type switches to currently used operating mode based on normalcy of the one of the first and second ring type switches checked by the internal operation surveillance function, the power supply status of the another one of the first and second ring type switches checked by the companion power supply checking function and the operating status of the another one of the first and second ring type switches checked by the companion operation monitoring function.

2. The ring type Ethernet system according to claim 1, wherein the one of the first and second ring connection control circuits further includes:

a media access control (MAC) address comparison function that compares a companion MAC address acquired by the BPDU frame and an MAC address of the one of the first and second ring connection control circuit, and an initialization processing function that determines whether the one of the first and second ring type switches will start operation in either the currently used operation mode or standby system operation mode based on the normalcy of the one of the first and second ring type switches checked by the internal operation surveillance function directly after introduction of power supply for the one of the first and second ring type switches or directly after a failure recovery, the power supply status of the another one of the first and second ring type switches confirmed by the companion power supply checking function, the operating status of the another one of the first and second ring type switches checked by the companion operation monitoring function and results of comparing the MAC addresses compared by the MAC address comparison function.

3. The ring type Ethernet system according to claim 1, wherein at least one of the first and second ring connection control circuits comprises:
- a first MAC processing part that is connected to one end of the one of the first and second sub-rings and sends and receives MAC frames to and from communications equipment,
- a second MAC processing part that is connected to the another one of the first and second ring type switches and sends and receives MAC frames to and from the another one of the first and second ring type switches,
- a rapid spanning tree protocol (RSTP) processing part that is connected to the first and second MAC processing parts, and which, along with carrying out redundant control processing for the one of the first and second sub-rings based on a rapid spanning tree protocol, includes the internal operation surveillance function, the companion power supply checking function and the redundant control processing function,
- a third MAC processing part that is connected to the switch part and sends and receives MAC frames, and
- a transfer processing part that transfers the MAC frames received by each of the first MAC processing part, the second MAC processing part and the third MAC processing part to any of the first MAC processing part, the second MAC processing part or the third MAC processing part based on destination information included in the MAC frames,
- wherein, when the first and second MAC processing parts receive a MAC frame that includes control information for the one of the first and second sub-rings that is used for redundancy control processing from the one of the first and second sub-rings, an output to the transfer processing part for the MAC frame is policed and the MAC frame is output to the RSTP processing part.

4. A ring type Ethernet system control method for use in a ring type Ethernet system that accomplishes Ethernet communications among communications equipment connected to a first sub-ring and communications equipment connected to a second sub-ring by having a relay connection between the first and second sub-rings which connect each of a plurality of different communications equipment in a ring form, wherein the ring type Ethernet system includes a first ring type switch that, along with being connected in series to the first sub-ring, is connected in series to the second sub-ring and a second ring type switch that, along with being connected in series to the first sub-ring, is connected in series to the second sub-ring, the method comprising steps of:
- exchanging operating statuses between the first and second ring type switches;
- operating one of the first and second ring type switches as a system currently used;
- making a relay connection between the first and second sub-rings;
- operating another one of the first and second ring type switches as a standby system; and
- stopping relay connections between the first and second sub-rings by carrying out redundant control processing based on the operating statuses, wherein:
- the first ring type switch includes a first ring connection control circuit that is connected in series to the first sub-ring, a second ring connection control circuit that is connected in series to the second sub-ring and a switch part that makes relay connections with the first and second ring connection control circuits,
- the one of the first and second ring connection control circuits executes:
  - an internal operation surveillance step that confirms normal operation by the one of the first and second ring connection control circuits by exchanging internal operation surveillance frames with another one of the first and second ring connection control circuits through the switch part,
  - a companion power supply checking step that checks a power supply status of the another one of the first and second ring type switches based on a power supply status signal from the another one of the first and second ring type switches,
  - a companion operation monitoring step that mutually checks the operating status by exchanging extended bridge protocol data unit (BPDU) frames with the another on of the first and second ring type switches through the one of the first and second sub-rings, and
  - a redundant control processing step that, when the one of the first and second ring type switches is operating as the standby system, determines whether or not to switch operation of the one of the first and second ring type switches to currently used operating mode based on normalcy of the one of the first and second ring type switches checked in the internal operation surveillance step, the power supply status of the another one of the first and second ring type switches checked in the companion power supply checking step and the operating status of the another one of the first and second ring type switches checked in the companion operation monitoring step.

5. The ring type Ethernet system control method according to claim 4, wherein:
- the one of the first and second ring connection control circuits further executes a media access control (MAC) address comparison step that compares a companion MAC address acquired by a BPDU frame and an MAC address of the one of the first and second ring connection control circuits, and
- an initialization processing step that determines whether the one of the first and second ring type switches will start an operation in either currently used system mode or standby system mode based on the normalcy of the one of the first and second ring type switches checked in the internal operation surveillance step directly after introduction of power supply for the one of the first and second ring type switches or directly after a failure recovery, the power supply status of the another one of the first and second ring type switches confirmed in the companion power supply checking step, the operating status of another one of the first and second ring type switches checked in the companion operation monitoring step and results of comparing the MAC addresses compared in the MAC address comparison step.

6. The ring type Ethernet system control method according to claim 4, wherein:
- at least one of the first and second ring connection control circuits executes:
  - a first MAC processing step where a first MAC processing part sends and receives MAC frames to and from the communications equipment through one end of the one of the first and second sub-rings,
  - a second MAC processing step where a second MAC processing part sends and receives MAC frames to and from the another one of the first and second ring type switches,
  - a rapid spanning tree protocol (RSTP) processing step where an RSTP processing part connected to the first and second MAC processing parts, carries out redundant control processing for the one of the first and second sub-rings based on a rapid spanning tree protocol, and executes the internal operation surveillance step, the companion power supply checking step and the redundant control processing step, a third MAC processing step where a third MAC processing part sends and receives MAC frames to and from the switch part, and a transfer processing step where a transfer processing part carries out mutual exchange of the MAC frames from the one of the first and second sub-rings received by the first and second MAC processing parts and the MAC frames from the switch part received by the third MAC processing part, and when in the first and second MAC processing steps, a MAC frame that includes control information for the one of the first and second sub-rings that is used for redundancy and control processing has been received, an output to the transfer processing part for the MAC frame is policed, and the MAC frame is output to the RSTP processing part.

7. A ring type Ethernet system for Ethernet communications, comprising:

a first sub-ring including first communication equipment connected in a ring form;

a second sub-ring including second communication equipment connected in a ring form;

a relay connection connecting between the first and second sub-rings;

a first ring type switch that is connected in series to the first sub-ring and is connected in series to the second sub-ring; and a second ring type switch that is connected in series to the first sub-ring and is connected in series to the second sub-ring, wherein:

the first ring type switch includes:

a first ring connection control circuit that is connected in series to the first sub-ring;

a second ring connection control circuit that is connected in series to the second sub-ring; and a switch part that makes relay connections with the first and second ring connection control circuits, the ring type Ethernet system is configured such that:

an operating status of the first ring type switch and an operating status of the second ring type switch are exchanged between the first and second ring type switches; and by carrying out redundant control processing based on the operating statuses of the first and second ring type switches, one of the first and second ring type switches operates as a currently-used system by making a relay connection between the first and second sub-rings, and another one of the first and second ring type switches operates as a standby system by stopping relay connections between the first and second sub-rings, and the first ring connection control circuit is configured to execute:

an internal operation surveillance function that confirms a normal operation by the first ring connection control circuit by exchanging internal operation surveillance frames with the second ring connection control circuits through the switch part;

a companion power supply checking function that checks a power supply status of the second ring type switch based on a power supply status signal from the second ring type switch;

a companion operation monitoring function that mutually checks the operating statuses by exchanging extended bridge protocol data unit (BPDU) frames with the second ring type switch through the first sub-ring; and a redundant control processing function that, when the first ring type switch is operating as the standby system, determines whether or not to switch an operation of the first ring type switch to currently-used operating mode based on normalcy of the first ring type switch checked by the internal operation surveillance function, the power supply status of the second ring type switch checked by the companion power supply checking function and the operating status of the second ring type switch checked by the companion operation monitoring function.

8. The ring type Ethernet system according to claim 7, wherein the first ring connection control circuit is further configured to execute:

a media access control (MAC) address comparison function that compares an MAC address of the second ring connection control circuit acquired by the BPDU frame and an MAC address of the first ring connection control circuit; and an initialization processing function that determines whether the first ring type switch will start operation in either the currently-used operation mode or standby system operation mode based on the normalcy of the first ring type switch checked by the internal operation surveillance function directly after introduction of power supply for the first ring type switch or directly after a failure recovery, the power supply status of the second ring type switch confirmed by the companion power supply checking function, the operating status of the second ring type switch checked by the companion operation monitoring function and results of comparing the MAC addresses compared by the MAC address comparison function.

9. The ring type Ethernet system according to claim 7, wherein the first ring connection control circuit comprises:

a first MAC processing part that is connected to one end of the first sub-ring and sends and receives MAC frames to and from the first communication equipment;

a second MAC processing part that is connected to the second ring type switch and sends and receives MAC frames to and from the second ring type switch;

a rapid spanning tree protocol (RSTP) processing part which is connected to the first and second MAC processing parts, and which is configured to carry out redundant control processing for the first sub-ring based on a rapid spanning tree protocol and to execute the internal operation surveillance function, the companion power supply checking function and the redundant control processing function;

a third MAC processing part that is connected to the switch part and sends and receives MAC frames; and a transfer processing part that transfers the MAC frames received by each of the first MAC processing part, the second MAC processing part and the third MAC processing part to any of the first MAC processing part, the second MAC processing part or the third MAC processing part based on destination information included in the Mac frames, wherein, when the first and second MAC processing parts receive a MAC frame that includes control information for the first sub-ring that is used for redundancy control processing from the first sub-ring, an output to the transfer processing part for the MAC frame is policed and the MAC frame is output to the RSTP processing part.

10. The ring type Ethernet system according to claim 7, wherein the second ring connection control circuit comprises:
a first MAC processing part that is connected to one end of the second sub-ring and sends and receives MAC frames to and from the second communication equipment;
a second MAC processing part that is connected to the second ring type switch and sends and receives MAC frames to and from the second ring type switch;
a rapid spanning tree protocol (RSTP) processing part which is connected to the first and second MAC processing parts, and which is configured to carry out redundant control processing for the second sub-ring based on a rapid spanning tree protocol and to execute the internal operation surveillance function, the companion power supply checking function and the redundant control processing function;
a third MAC processing part that is connected to the switch part and sends and receives MAC frames; and
a transfer processing part that transfers the MAC frames received by each of the first MAC processing part, the second MAC processing part and the third MAC processing part to any of the first MAC processing part, the second MAC processing part or the third MAC processing part based on destination information included in the MAC frames,
wherein, when the first and second MAC processing parts receive a MAC frame that includes control information for the second sub-ring that is used for redundancy control processing from the second sub-ring, an output to the transfer processing part for the MAC frame is policed and the MAC frame is output to the RSTP processing part.

11. A ring type Ethernet system control method for use in a ring type Ethernet system that accomplishes Ethernet communications among first communication equipment connected to a first sub-ring and formed in a ring form and second communication equipment connected to a second sub-ring and formed in a ring form, the first and second sub-rings being connected by a relay connection, wherein the ring type Ethernet system includes a first ring type switch that is connected in series to the first sub-ring and is connected in series to the second sub-ring and a second ring type switch that is connected in series to the first sub-ring and is connected in series to the second sub-ring, the method comprising steps of:
exchanging operating statuses between the first and second ring type switches;
operating one of the first and second ring type switches as a system currently-used;
making a relay connection between the first and second sub-rings;
operating another one of the first and second ring type switches as a standby system; and
stopping the relay connection between the first and second sub-rings by carrying out redundant control processing based on the operating statuses, wherein:
the first ring type switch includes a first ring connection control circuit that is connected in series to the first sub-ring, a second ring connection control circuit that is connected in series to the second sub-ring and a switch part that makes the relay connection with the first and second ring connection control circuits, and
the method further comprising the following steps executed by the first ring connection control circuits:
an internal operation surveillance step that confirms normal operation by the first ring connection control circuits by exchanging internal operation surveillance frames with the second ring connection control circuit through the switch part;
a companion power supply checking step that checks a power supply status of the second ring type switch based on a power supply status signal from the second ring type switch;
a companion operation monitoring step that mutually checks the operating status by exchanging extended bridge protocol data unit (BPDU) frames with the second ring type switch through the first sub-ring; and
a redundant control processing step that, when the first ring type switch is operating as the standby system, determines whether or not to switch operation of the first ring type switch to currently-used operating mode based on normalcy of the first ring type switch checked in the internal operation surveillance step, the power supply status of the second ring type switch checked in the companion power supply checking step and the operating status of the second ring type switch checked in the companion operation monitoring step.

12. The ring type Ethernet system control method according to claim 11, further comprising the following steps executed by the first ring connection control circuit:
a media access control (MAC) address comparison step that compares an MAC address of the second ring connection control circuit acquired by a BPDU frame and an MAC address of the first ring connection control circuit, and
an initialization processing step that determines whether the first ring type switch will start an operation in either currently-used system mode or standby system mode based on the normalcy of the first ring type switch checked in the internal operation surveillance step directly after introduction of power supply for the first ring type switch or directly after a failure recovery, the power supply status of the second ring type switch confirmed in the companion power supply checking step, the operating status of the second ring type switch checked in the companion operation monitoring step and results of comparing the MAC addresses compared in the MAC address comparison step.

13. The ring type Ethernet system control method according to claim 11, further comprising the following steps executed by the first ring connection control circuit:
a first MAC processing step where a first MAC processing part sends and receives MAC frames to and from the first communications equipment through one end of the first sub-ring;
a second MAC processing step where a second MAC processing part sends and receives MAC frames to and from the second ring type switch;
a rapid spanning tree protocol (RSTP) processing step where an RSTP processing part connected to the first and second MAC processing part carries out redundant control processing for the first sub-ring based on a rapid spanning tree protocol, the internal operation surveillance step, the companion power supply checking step and the redundant control processing step;
a third MAC processing step where a third MAC processing part sends and receives MAC frames to and from the switch part; and
a transfer processing step where a transfer processing part carries out mutual exchange of the MAC frames from the first sub-ring received by the first and second MAC processing parts and the MAC frames from the switch part received by the third MAC processing part, wherein, when in the first and second MAC processing steps, a MAC frame that includes control information for the first sub-ring that is used for redundancy and control processing has been received, an output to the transfer processing part for the MAC frame is policed, and the MAC frame is output to the RSTP processing part.

14. The ring type Ethernet system control method according to claim 11, further comprising the following steps executed by the second ring connection control circuit:

a first MAC processing step where a first MAC processing part sends and receives MAC frames to and from the second communications equipment through one end of the second sub-ring;

a second MAC processing step where a second MAC processing part sends and receives MAC frames to and from the second ring type switch;

a rapid spanning tree protocol (RSTP) processing step where an RSTP processing part connected to the first and second MAC processing part carries out redundant control processing for the second sub-ring based on a rapid spanning tree protocol, the internal operation surveillance step, the companion power supply checking step and the redundant control processing step;

a third MAC processing step where a third MAC processing part sends and receives MAC frames to and from the switch part; and a transfer processing step where a transfer processing part carries out mutual exchange of the MAC frames from the second sub-ring received by the first and second MAC processing parts and the MAC frames from the switch part received by the third MAC processing part, wherein, when in the first and second MAC processing steps, a MAC frame that includes control information for the second sub-ring that is used for redundancy and control processing has been received, an output to the transfer processing part for the MAC frame is policed, and the MAC frame is output to the RSTP processing part.

* * * * *